United States Patent
Klingbeil et al.

(10) Patent No.: US 11,506,133 B2
(45) Date of Patent: Nov. 22, 2022

(54) METHOD FOR FUEL DELIVERY

(71) Applicant: General Electric Company, Schenectady, NY (US)

(72) Inventors: Adam Edgar Klingbeil, Ballston Lake, NY (US); William James Mailander, Beverly, MA (US)

(73) Assignee: General Electric Company, Schenectady, NY (US)

(*) Notice: Subject to any disclaimer, the term of this patent is extended or adjusted under 35 U.S.C. 154(b) by 87 days.

(21) Appl. No.: 16/809,711

(22) Filed: Mar. 5, 2020

(65) Prior Publication Data
US 2021/0277836 A1 Sep. 9, 2021

(51) Int. Cl.
*F02C 9/28* (2006.01)

(52) U.S. Cl.
CPC ............ *F02C 9/28* (2013.01); *F23N 2221/10* (2020.01)

(58) Field of Classification Search
None
See application file for complete search history.

(56) References Cited

U.S. PATENT DOCUMENTS

| | | | |
|---|---|---|---|
| 4,386,858 A | 6/1983 | Kude et al. | |
| 6,226,976 B1 | 5/2001 | Scott et al. | |
| 6,522,994 B1 | 2/2003 | Lang | |
| 7,134,284 B2 | 11/2006 | Lohn | |
| 8,572,975 B2 | 11/2013 | Bilton et al. | |
| 8,731,797 B2 | 5/2014 | Demougeot et al. | |
| 8,783,040 B2 | 7/2014 | Erickson et al. | |
| 8,833,052 B2 | 9/2014 | Loeven, II | |
| 9,506,649 B2 | 11/2016 | Rennie et al. | |
| 2011/0247315 A1* | 10/2011 | Rhoden | F02C 9/40 60/39.281 |
| 2016/0041024 A1 | 2/2016 | Reimer | |
| 2016/0258798 A1* | 9/2016 | Muhammad | F02C 9/28 |
| 2019/0063253 A1 | 2/2019 | Andrus et al. | |

FOREIGN PATENT DOCUMENTS

| | | |
|---|---|---|
| EP | 3109604 | 12/2016 |
| GB | 2254924 | 10/1992 |

OTHER PUBLICATIONS

Hasanshin, T.S., Samuilov, V.S. & Shchemelev, A.P. J Eng Phys Thermophy (2008) 81: 760. https://doi.org/10.1007/s10891-008-0093-5.
Turns, 'An Introduction to Combustion', McGraw Hill, 2000.
Luning Prak, D., Cowart, J.S., McDaniel, A.M., Trulove, P.C., J. Chem. Eng. Data 2014, 59, 11, 3571-3585.
Prak, Dianne & Cowart, Jim & Trulove, Paul. (2014). Journal of Chemical & Engineering Data. 59. 3842-3851. 10.1021/je5007532.

(Continued)

*Primary Examiner* — Katheryn A Malatek
(74) *Attorney, Agent, or Firm* — Fitch, Even, Tabin & Flannery, LLP (57) ABSTRACT

A method of delivering fuel to an engine during operation of the engine, that includes, sensing the speed of sound in the fuel, determining a density or property of the fuel, and based on that density or fuel property adjusting the flow rate of the fuel. Further, an established fuel profile or determined energy density value can also be used to adjust the flow rate of the fuel.

18 Claims, 4 Drawing Sheets (56) References Cited

OTHER PUBLICATIONS

Luning Prak, D., Alexandre, S.M., Cowart, J.S., Trulove, J. Chem. Eng. Data 2014, 59, 4, 1334-1346.
Outcalt, S & Laesecke, Arno & J. Fortin, Tara. (2010). Journal of Chemical Thermodynamics—J Chem Thermodyn. 42. 700-706. 10.1016/j.jct.2010.01.003.
Dashti, H & Riazi, M. (2014). Journal of Petroleum Science and Engineering. 124. 94-104.
Boeing 777 FQIS System Overview; as early as May 9, 2019.

* cited by examiner

METHOD FOR FUEL DELIVERY

TECHNICAL FIELD

This disclosure relates to a method of fuel delivery to an engine that is based on at least one fuel property, where fuel delivery is determined during operation of the engine.

BACKGROUND

A fuel burning engine is typically supplied fuel by a fuel pump with a suitable metering arrangement that controls the rate at which fuel from the fuel pump is supplied to the engine for purposes of combustion. The rate at which fuel is supplied is independent of the actual energy density of the supplied fuel. However, the energy density of the supplied fuel can vary depending on different formulations, additives, and fuel age. Such variation can occur even when the fuel complies with the same industry standards for aviation fuel. The different energy capacity can result in different fuels providing different outputs, such as different thrust outputs for a gas turbine engine at the same throttle or thrust setting.

BRIEF DESCRIPTION

In one aspect, the present disclosure relates to a method of adjusting the flow rate of fuel to an engine during operation of the engine, the method including sensing the speed of sound in the fuel being delivered to the engine during operation of the engine, determining a density of the fuel based on the sensed speed of sound during operation of the engine, and adjusting the flow rate of the fuel being delivered to the engine during operation of the engine based on the determined density.

In another aspect, the present disclosure relates to a method of delivering fuel to an engine during operation of the engine, the method including receiving an input indicative of an energy output required during the operation of the engine, sensing the speed of sound in the fuel being delivered to the engine during operation of the engine, determining a density of the fuel based on the sensed speed of sound in the fuel during operation of the engine, and delivering fuel to the engine during operation of the engine based on the energy output required and the determined density of the fuel.

DETAILED DESCRIPTION

Aspects described herein provide a method of adjusting fuel flow to an engine during operation of the engine. The adjustment of the fuel flow can be in real time. The term "real time" as used herein, relates to information that is gathered and processed so quickly that feedback is virtually immediately available. By way of non-limiting example, the delivery of fuel to a gas turbine engine can be determined or adjusted in real time during a cycle of operation of the gas turbine engine. One non-limiting example of the cycle of operation can be a flight path. Additionally, or alternatively, data acquired during the operation of the engine can be averaged or otherwise used in calculations to adjust the fuel flow during operation of the engine.

Adjusting the flow rate of the fuel or modulating the delivery of the fuel depends on sensing the speed of sound in the fuel. Optionally, modulation of the supply of fuel can depend on multiple fuel properties monitored during the operation of the engine, which are used to adjust the flow rate of the fuel being delivered to the engine.

By way of non-limiting example, the engine is illustrated herein as a gas turbine engine. However, the disclosure is applicable to any fuel burning engine and may be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an example, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
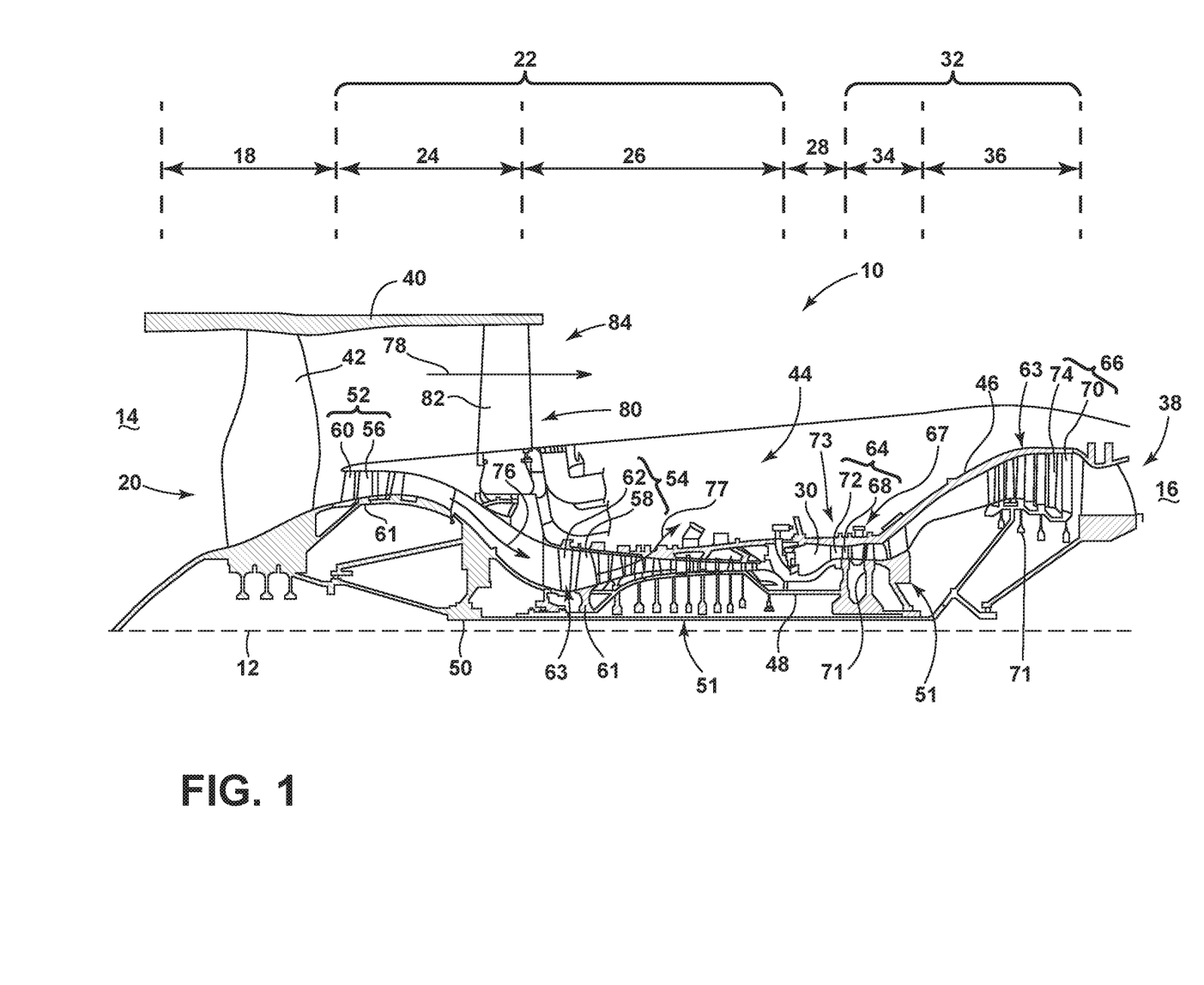
FIG. 1 is a schematic, sectional view of a gas turbine engine.

FIG. 1 is a schematic cross-sectional diagram of a gas turbine engine 10 for an aircraft. The gas turbine engine 10 has a centerline or longitudinal axis 12 extending forward 14 to aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the longitudinal axis 12. The HP compressor 26, the combustor 30, and the HP turbine 34 form an engine core 44, which generates combustion gases. The engine core 44 is surrounded by core casing 46, which can be coupled with the fan casing 40.

A HP shaft or spool 48 disposed coaxially about the longitudinal axis 12 of the gas turbine engine 10 drivingly connects the HP turbine 34 to the HP compressor 26. A LP shaft or spool 50, which is disposed coaxially about the longitudinal axis 12 of the gas turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define an inner rotor/stator 51. While illustrated as a rotor, it is contemplated that the inner rotor/stator 51 can be a stator.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the longitudinal axis 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the longitudinal axis 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the gas turbine engine 10, such as the static vanes 60, 62, 72, 74 among the compressor and turbine section 22, 32 are also referred to individually or collectively as an outer rotor/stator 63. As illustrated, the outer rotor/stator 63 can refer to the combination of non-rotating elements throughout the gas turbine engine 10. Alternatively, the outer rotor/stator 63 that circumscribes at least a portion of the inner rotor/stator 51, can be designed to rotate. The inner or outer rotor/stator 51, 63 can include at least one component that can be, by way of non-limiting example, a shroud, vane, nozzle, nozzle body, combustor, hanger, or blade, where the at least one component is a plurality of circumferentially arranged component segments having confronting pairs of circumferential ends.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can provided to engine components requiring cooling. The temperature of pressurized airflow 76 entering the combustor 30 is significantly increased compared to ambient temperature. As such, cooling provided by the bleed air 77 can be necessary for operating some of the engine components in the heightened temperature environments.

A remaining portion of the airflow 78 bypasses the LP compressor 24 and the engine core 44 and exits the gas turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
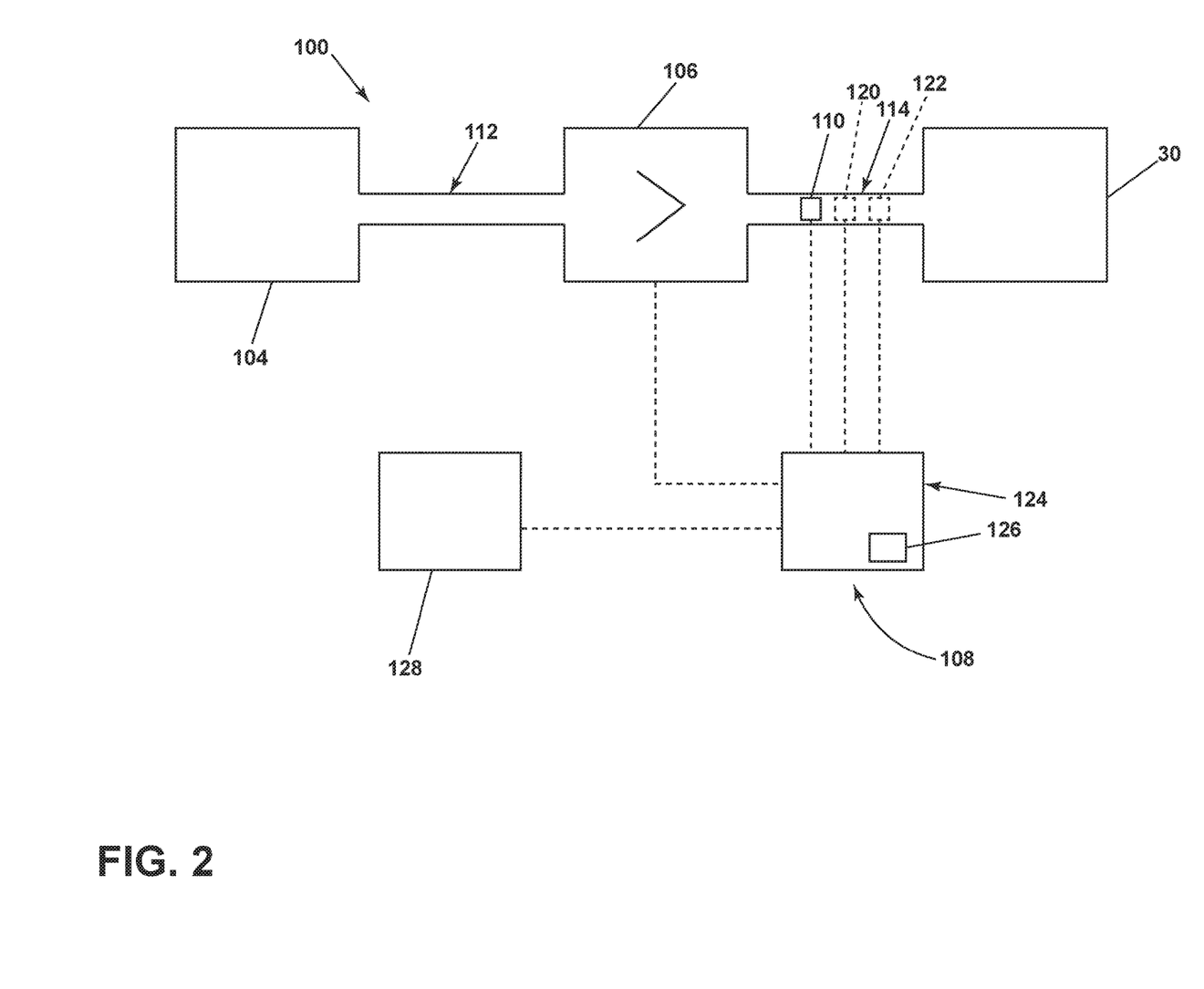
FIG. 2 is a schematic fuel delivery system of the gas turbine engine of FIG. 1.

FIG. 2 schematically illustrates a fuel delivery system 100. By way of non-limiting example, the fuel delivery system 100 supplies a fuel flow to the combustor 30 of the gas turbine engine 10. It is contemplated that the fuel delivery system 100 can couple to multiple combustors, which can include, by way of non-limiting example, combustion chambers and/or afterburners.

The fuel delivery system 100 can include a fuel tank 104, a fuel pump 106, a control assembly 108, and at least one sensor 110 in communication with the control assembly 108. The fuel tank 104 is fluidly coupled to the fuel pump 106 and the combustor 30 via a fuel line. The fuel line is illustrated, by way of non-limiting example, as first and second conduits 112, 114. The first or second conduits 112, 114 can be used to fluidly connect the fuel tank 104, the fuel pump 106, and the combustor 30 for the supply of fuel to the combustor 30. The at least one sensor 110 is illustrated, by way of non-limiting example, within the second conduit 114. It is contemplated that the at least one sensor 110 can be located adjacent to or contained within any portion of the fuel delivery system 100 or the combustor 30.

The at least one sensor 110 can be an ultrasonic sensor. The ultrasonic sensor can, for example, be a flowmeter, such as an ultrasonic Doppler flowmeter. Additionally, or alternatively, the at least one sensor 110 can be a positive displacement flow meter, a mass flowmeter, a thermal flowmeter, or a Coriolis flowmeter.

Optionally, the fuel delivery system 100 can include additional sensors 120, 122. The additional sensors 120, 122 can detect, measure, or otherwise sense fuel properties. Fuel properties can include, but are not limited to, composition of the fuel, a temperature of the fuel, or a pressure of the fuel. While illustrated in the second conduit 114, the additional sensors 120, 122 can be located adjacent to or contained within any portion of the fuel delivery system 100 or the combustor 30. It is contemplated that the additional sensors 120, 122 can be coupled to, formed with, or otherwise in communication with the at least one sensor 110. It is further contemplated that any number of additional sensors 120, 122 can be included in or in communication with the fuel delivery system 100 or control assembly 108.

The control assembly 108 can control the amount of fuel supplied to the combustor 30. Further, the control assembly 108 can control the operation of the working components of the fuel delivery system 100, such as, for example, the fuel pump 106. The control assembly 108 can include a controller 124, where the controller 124 can be any number of controllers.

The controller 124 can be provided with a memory 126. The memory 126 can be used for storing control software or information, such as a database or table, or to store data received by the controller 124. The control software, by way of non-limiting example, can control the fuel pump 106 to which the controller 124 is communicatively coupled.

The database or table can, at least, include predetermined fuel properties from known fuel sources, while the data received can be from the at least one sensor 110 or the additional sensors 120, 122 that are in communication with the controller 124. The data received can be a raw or processed signal from the at least one sensor 110 or the additional sensors 120, 122. The database or table can be either locally stored in the memory 126, accessible online, or a user can input the data.

The controller 124 can be in communication with a flight management system (FMS) 128. Alternatively, the control assembly 108 can be at least part of or contained within in the FMS 128. The FMS 128 and controller 124 can exchange information or data.

The control assembly 108 can include additional factors when determining the flow rate of the fuel to the gas turbine engine 10. The additional factors can be communicated to or detected by the control assembly 108 via sensors on the aircraft (not shown) or the FMS 128. Non-limiting examples of the additional factors can include, but are not limited to, altitude of the gas turbine engine, density or composition of the fluid encountered by the gas turbine engine, or moisture levels as measured on the exterior or interior of one or more portions of the gas turbine engine 10 or aircraft.

Figure 3:
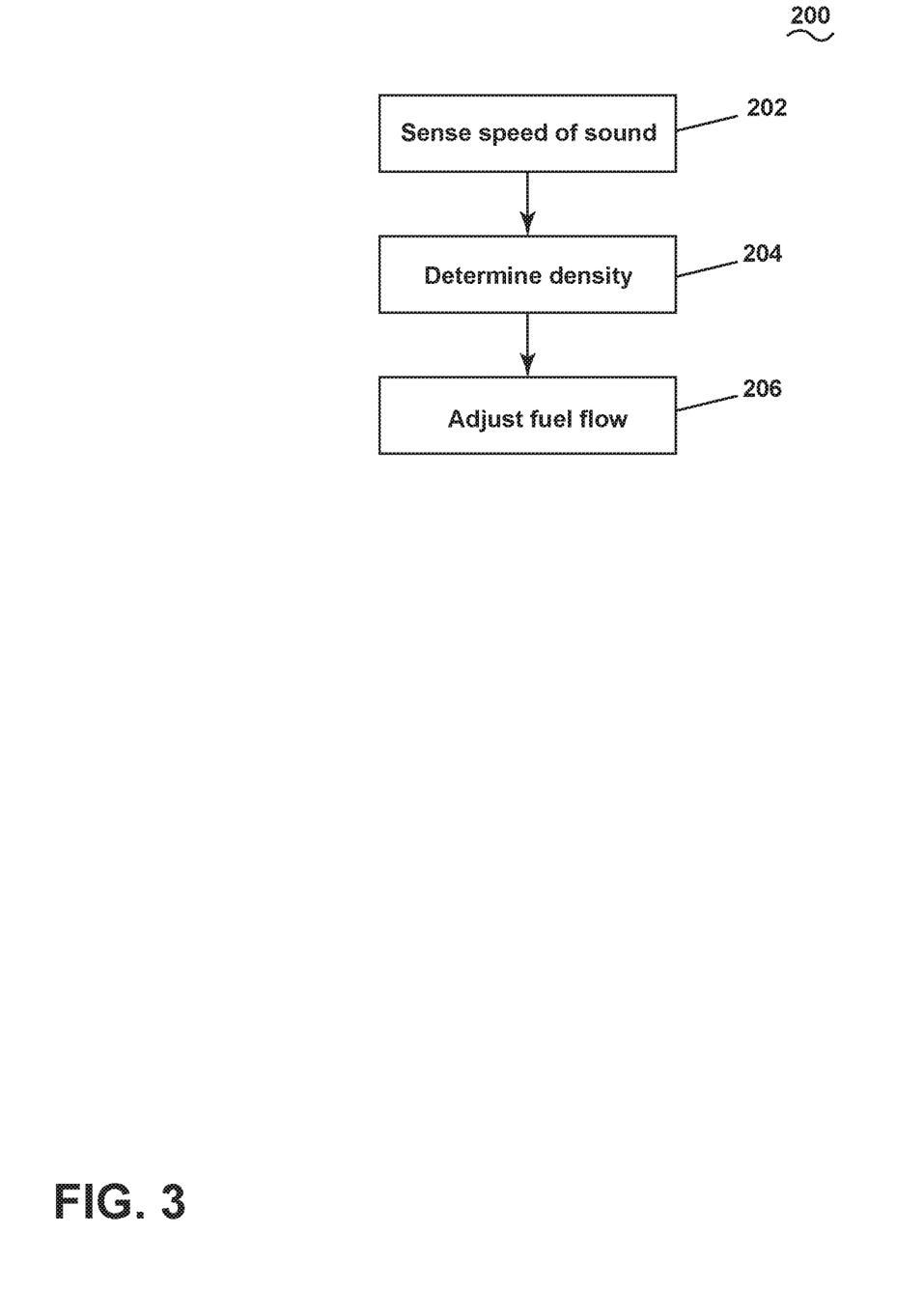
FIG. 3 illustrates a flowchart of a method of adjusting the flow rate of fuel to the gas turbine engine in FIG. 1.

FIG. 3 illustrates a method 200 of adjusting the flow rate of fuel to the gas turbine engine 10 during operation of the gas turbine engine 10. The flow rate of fuel can be adjusted in real time or using data acquired during operation of the gas turbine engine 10. The method 200, can be performed while the gas turbine engine 10 is operating, for example, during flight. At 202, during operation of the gas turbine engine 10, the speed of sound in the fuel being delivered to gas turbine engine can be sensed using the at least one sensor 110. The at least one sensor 110 can be an ultrasonic doppler flowmeter. The ultrasonic doppler flowmeter sends and receives sonic signals. The difference of phase, amplitude, period, or frequency between the sent and received signals can provide one or more properties of the fuel, such as the speed of sound in the fuel or composition of the fuel. The at 204, during operation of the gas turbine engine 10, a density of the fuel is determined based on the determined speed of sound or composition of the fuel. One non-limiting example of determining or calculating the density of the fuel based on the speed of sound in the fuel can be expressed as shown in Equation 1 below:

$$\rho = \frac{K}{v^2} \quad (1)$$

where ρ represents the density of the fuel, K represents the bulk modulus of the fuel, and v represents the speed of sound in the fuel. It is contemplated that K, bulk modulus, is known or can be calculated as shown in Equation 2 below:

$$K = \Delta P \Big/ \frac{\Delta V}{V} \quad (2)$$

where P represents pressure, V represents volume, and where Δ represents a change in that aspect. Values for Equation 2 can be provided by the at least one sensor 110, the additional sensors 120, 122, or one or more databases. It is contemplated that Equations 1 and 2 can be modified to further include the composition of the fuel, the velocity of the fuel, or the temperature of the fuel. It is further contemplated that equations 1 and 2 can be any number or type of equations or databases that utilize the speed of sound in the fuel to calculate the density of the fuel.

At 206, during operation of the gas turbine engine 10, the flow rate of the fuel being delivered to the gas turbine engine can be adjusted based on the determined density. By way of non-liming example, the controller 124 can communicate with the fuel pump 106 to adjust the flow to the combustor 30.

It is contemplated that any of the steps for the method 200 can be determined, sensed, or adjusted, in real time or using data acquired during operation of the gas turbine engine 10.

Figure 4:
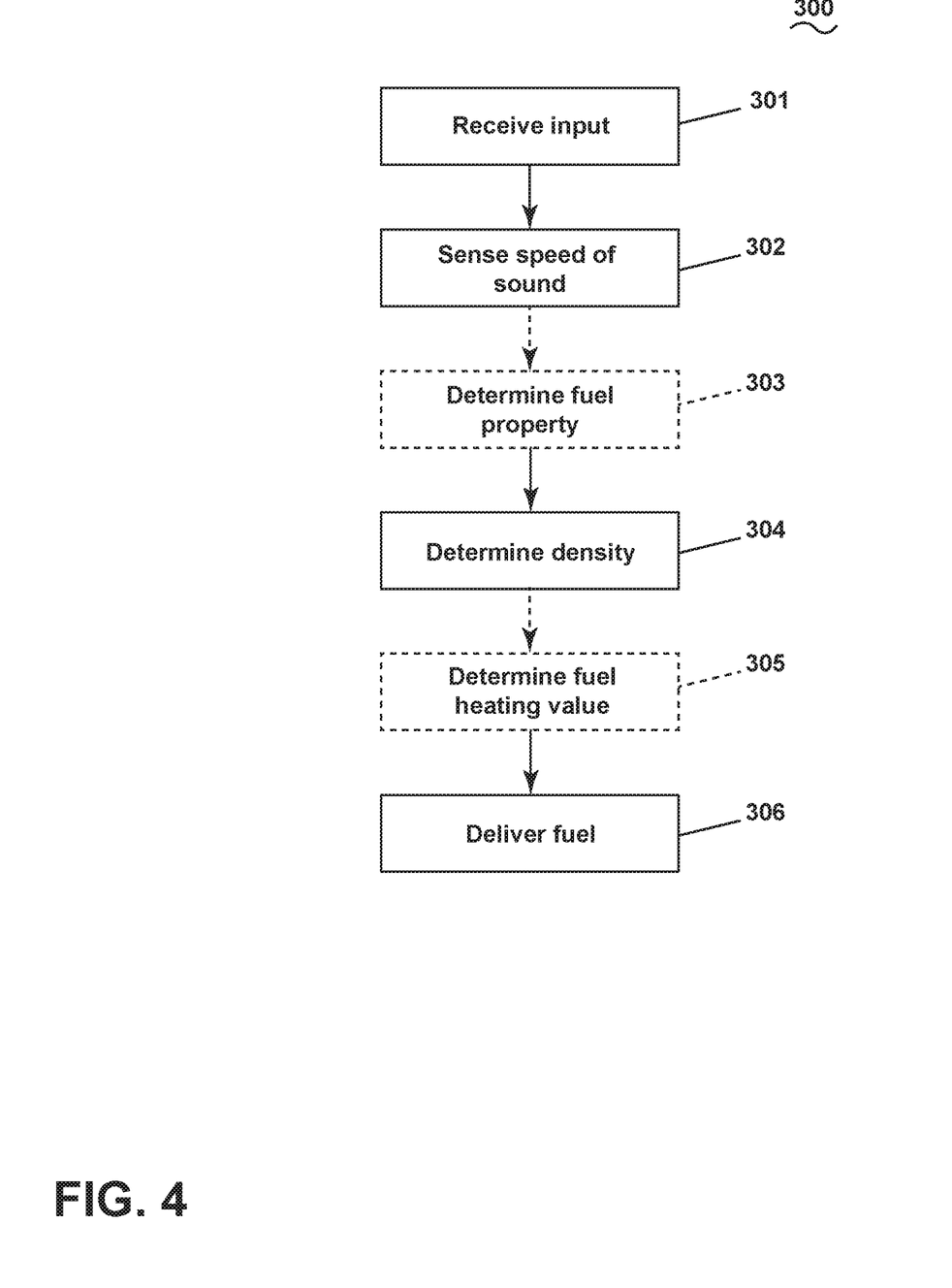
FIG. 4 illustrates a flowchart of a method of delivering fuel to the gas turbine engine of FIG. 1.

FIG. 4 illustrates a specifically implementation of the method 200 as method 300. Similarly, it is contemplated that any of the steps for the method 300 can be determined, sensed, received, adjusted, or delivered in real time or using data acquired during operation of the gas turbine engine 10.

In operation, at 301, the controller 124 of the control assembly 108 can receive an input from the FMS 128. The input can be indicative of an energy output required by the gas turbine engine 10. Prior to, concurrently, or shortly after the input is received by the controller 124, the speed of sound is sensed at 302. The at least one sensor 110 communicates the sensed speed of sound in the fuel to the controller 124. The communication can include the speed of sound or a signal from which the controller can determine the speed of sound through the fuel.

Optionally, at 303, the sensor 110 or the additional sensors 120, 122 can provide fuel properties to the controller 124 or signals interpreted as fuel properties. These fuel properties can include, but are not limited to composition of the fuel, fuel pressure or fuel temperature. At 304, the speed of sound or at least one fuel property other than the speed of sound can be used to determine a density of the fuel. It is considered that the sensor 110 can provide information that can be interpreted to determine the composition of the fuel.

Optionally at 305, during operation of the gas turbine engine 10, an energy density for the fuel is determined based on the determined density. A fuel heating value or energy density value can be determined by matching the determined density to a reference density correlated to the energy density value. That is, the controller 124 can match the determined density with the reference density values stored in the memory 126 of the controller 124. The reference density values can provide a correlated energy density value so that, during operation of the gas turbine engine 10, the energy density of the fuel can be established.

Optionally, a fuel profile can be established during operation of the gas turbine engine 10. The fuel profile can include directly measured values, calculated values, input values, or any combination therein. The fuel profile can include at least the speed of sound in the fuel, temperature of the fuel, and pressure of the fuel. Additionally, or alternatively to the speed of sound in the fuel, temperature of the fuel, and pressure of the fuel, the fuel profile can include fluid velocity of the fuel, composition of the fuel. That is, the fuel profile can be determined based on at least four of fluid velocity, composition of the fuel, speed of sound in the fuel, temperature of the fuel, and pressure of the fuel and matching that fuel profile with a list of reference fuel profiles of the fuel. The established fuel profile can be used to match a reference fuel profile to obtain the energy density value of the fuel at 305. Matching using the established fuel profile can be done in addition to, or as an alternative to, matching using the determined density.

The energy density value can provide information related to the energy output of the fuel. For example, the energy density value can be an energy per mass or energy per volume value. For example, the energy density can be measured in joules per kilogram or joules per cubic meter. Knowing the energy output of the fuel allows the controller 124 to provide the combustor 30 with the amount of fuel required to meet the energy output needed, as indicated by the input from the FMS 128.

Therefore, the controller 124, during operation of the gas turbine engine 10, at 306 can adjust the flow rate of the fuel being delivered to the gas turbine engine 10 based on the determined density or the fuel profile to the gas turbine engine 10. That is, the flow rate of the fuel being delivered to the gas turbine engine 10 is adjusted based on the energy output required and the density of the fuel or the fuel profile.

Further, the controller 124 adjusts the flow rate of fuel via the fuel pump 106 to provide the right amount of fuel to the combustor 30, resulting in force or thrust providing the predetermined energy corresponding to the energy output indicated by the input from the FMS 128.

Benefits of aspects of the present disclosure include an increase in fuel efficiency. by controlling and adjusting, during operation of the gas turbine engine 10, the fuel flow to the combustor. The speed of sound in the fuel and the density prove a clear picture of the fuel heating value (BTU) or energy density (joule/kilogram or joule/cubic meter) of the fuel. Knowing how much energy is provided by the fuel allows for proper delivery of the fuel based on the thrust or energy requested by the user. The fuel heating value or energy density can be further refined using, for example, composition of the fuel.

Benefits of aspects of the present disclosure include better engine performance. For example, a thrust increase can occur as a result of real time determination of energy density that adjusts or maintains fuel flow.

Another benefit can be the thrust or energy requested by the user can be better matched and more quickly matched to the fuel provided to the engine when the heating value or energy density value of the fuel is known. Further, temperatures in the engine can be better controlled or reduced while knowing the energy density and being able to control fuel flow while the engine is operating.

Yet another benefit is improved time on wing. Knowing the fuel heating value or the energy density value can allow for limits to be placed on BTU to the engine.

Still yet another benefit is detection of fuel quality. The fuel quality can be quickly determined and if the fuel quality does not reach a predetermined quality level, the user can be notified. Further, fuel composition can be determined and if the fuel composition is outside a predetermined composition or includes undesirable molecules, the user can be notified.

Another benefit of aspects of the present disclosure is a cost saving benefit in that some of the current fuel metering devises, bypass valves, or other fuel delivery controls or hardware can be replaced with the disclosed method and sensors.

Another benefit can be a narrower thrust margin. The narrower thrust margin makes the engine performance more predictable and repeatable.

Another benefit can be a weight savings. The weight savings can be reflected in the components used to determine and deliver fuel or in the total amount of fuel added to an aircraft.

The inventive subject matter is not limited to the specific aspects described and illustrated herein. Different aspects and adaptations besides those shown herein and described, as well as many variations, modifications and equivalent arrangements will now be apparent or will be reasonably suggested by the foregoing specification and drawings, without departing from the substance or scope of the inventive subject matter.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A method of adjusting the flow rate of fuel to an engine during operation of the engine, the method including sensing the speed of sound in the fuel being delivered to the engine during operation of the engine, determining a density of the fuel based on the sensed speed of sound during operation of the engine, and adjusting the flow rate of the fuel being delivered to the engine during operation of the engine based on the determined density.

The method of any preceding clause wherein the sensing of the speed of sound in the fuel comprises determining the speed of sound with an ultrasonic flowmeter.

The method of any preceding clause wherein the determining of the density of the fuel further comprises determining at least one fuel property other than the speed of sound in the fuel and using the at least one fuel property and the speed of sound in the fuel to adjust the flow rate of the fuel being delivered to the engine.

The method of any preceding clause wherein the at least one fuel property comprises at least one of composition of the fuel, fuel pressure or a fuel temperature.

The method of any preceding clause further comprising determining in real time an energy density for the fuel based on the determined density of the fuel.

The method of any preceding clause wherein the determining of the energy density for the fuel comprises matching the determined density to a reference density correlated to an energy density value.

The method of any preceding clause wherein the matching comprises establishing a fuel profile that comprises at least one of the speed of sound in the fuel, composition of the fuel, temperature of the fuel, and pressure of the fuel and matching that fuel profile with a list of reference fuel profiles.

The method of any preceding clause wherein the adjusting of the flow rate is based on the energy density value.

The method of any preceding clause wherein the adjusting of the flow rate comprises supplying fuel at a rate to satisfy a predetermined energy.

The method of any preceding clause wherein the engine is a gas turbine engine.

The method of any preceding clause wherein the determining the density of the fuel, using output from at least the at least one sensor or additional sensors, can be performed by a user of the gas turbine engine or the control assembly.

The method of any preceding clause wherein the adjusting the flow rate of the fuel, using at least the determined density of the fuel or the output from at least the at least one sensor or additional sensors, can be performed by the user of the gas turbine engine or the control assembly.

A method of delivering fuel to an engine during operation of the engine, the method including receiving an input indicative of an energy output required during the operation of the engine, sensing the speed of sound in the fuel being delivered to the engine during operation of the engine, determining a density of the fuel based on the sensed speed of sound in the fuel during operation of the engine, and delivering fuel to the engine during operation of the engine based on the energy output required and the determined density of the fuel.

The method of any preceding clause wherein the sensing of the speed of sound in the fuel comprises determining the speed of sound with an ultrasonic flowmeter.

The method of any preceding clause wherein the determining of the density of the fuel further comprises determining at least one fuel property other than the speed of sound in the fuel and using the at least one fuel property and the speed of sound in the fuel to deliver fuel to the engine.

The method of any preceding clause wherein the at least one fuel property comprises at least one of composition of the fuel, fuel pressure, or fuel temperature.

The method of any preceding clause further comprising determining an energy density for the fuel based on the determined density of the fuel.

The method of any preceding clause wherein the determining of the energy density for the fuel comprises matching the determined density to a reference density correlated to an energy density value.

The method of any preceding clause wherein the matching comprises establishing a fuel profile that comprises at least one of the speed of sound in the fuel, composition of the fuel, temperature of the fuel, and pressure of the fuel and matching that fuel profile with a list of reference fuel profiles.

The method of any preceding clause wherein the matching comprises establishing a fuel profile that comprises at least four of fluid velocity, composition of the fuel, speed of sound in the fuel, temperature of the fuel, and pressure of the fuel and matching that fuel profile with a list of reference fuel profiles of the fuel.

The method of any preceding clause wherein the delivering of fuel to the engine is based on the energy density value.

The method of any preceding clause wherein the delivering of fuel to the engine comprises supplying fuel at a rate to satisfy a predetermined energy.

The method of any preceding clause wherein the engine is a gas turbine engine.

What is claimed is:

1. A method of adjusting a flow rate of fuel to an engine during operation of the engine, the method comprising:
   sensing a speed of sound in the fuel being delivered to the engine during operation of the engine;
   determining a density of the fuel based only on the sensed speed of sound during operation of the engine and a bulk modulus value for the fuel; and
   adjusting the flow rate of the fuel being delivered to the engine during operation of the engine based on the determined density.

2. The method of claim 1 wherein the sensing of the speed of sound in the fuel comprises determining the speed of sound with an ultrasonic flowmeter.

3. The method of claim 1 further comprising determining in real time an energy density for the fuel based on the determined density of the fuel.

4. The method of claim 3 wherein the determining of the energy density for the fuel comprises matching the determined density to a reference density correlated to an energy density value.

5. The method of claim 4 wherein the matching comprises establishing a fuel profile that comprises at least one of the speed of sound in the fuel, a composition of the fuel, a temperature of the fuel, and a pressure of the fuel and matching that fuel profile with a list of reference fuel profiles.

6. The method of claim 3 wherein the adjusting of the flow rate is based on the energy density value.

7. The method of claim 6 wherein the adjusting of the flow rate comprises supplying fuel at a rate to satisfy a predetermined energy requirement.

8. The method of claim 1 wherein the engine is a gas turbine engine.

9. A method of adjusting a flow rate of fuel to an engine during operation of the engine, the method comprising:
   sensing a speed of sound in the fuel being delivered to the engine during operation of the engine;
   determining a bulk modulus value for the fuel;
   determining a density of the fuel based only on the sensed speed of sound and the bulk modulus value during operation of the engine; and
   adjusting the flow rate of the fuel being delivered to the engine during operation of the engine based on the determined density.

10. A method of delivering fuel to an engine during operation of the engine, the method comprising:
    receiving an input indicative of an energy output required during the operation of the engine;
    sensing a speed of sound in the fuel being delivered to the engine during operation of the engine;
    determining a density of the fuel based only on the sensed speed of sound in the fuel and a bulk modulus value for the fuel during operation of the engine; and
    delivering the fuel to the engine during operation of the engine based on the energy output required and the determined density of the fuel.

11. The method of claim 10 wherein the sensing of the speed of sound in the fuel comprises determining the speed of sound with an ultrasonic flowmeter.

12. The method of claim 10 further comprising determining an energy density for the fuel based on the determined density of the fuel.

13. The method of claim 12 wherein the determining of the energy density for the fuel comprises matching the determined density to a reference density correlated to an energy density value.

14. The method of claim 13 wherein the matching comprises establishing a fuel profile that comprises at least one of the speed of sound in the fuel, a composition of the fuel, a temperature of the fuel, and a pressure of the fuel and matching that fuel profile with a list of reference fuel profiles.

15. The method of claim 13 wherein the matching comprises establishing a fuel profile that comprises at least four of a fluid velocity, a composition of the fuel, the speed of sound in the fuel, a temperature of the fuel, and a pressure of the fuel and matching that fuel profile with a list of reference fuel profiles of the fuel.

16. The method of claim 12 wherein the delivering of the fuel to the engine is based on the energy density value.

17. The method of claim 16 wherein the delivering of the fuel to the engine comprises supplying the fuel at a rate to satisfy a predetermined energy requirement.

18. A method of delivering fuel to an engine during operation of the engine, the method comprising:
    receiving an input indicative of an energy output required during the operation of the engine;
    sensing a speed of sound in the fuel being delivered to the engine during operation of the engine;
    determining a bulk modulus value for the fuel;
    determining a density of the fuel based only on the sensed speed of sound in the fuel and the bulk modulus value during operation of the engine; and
    delivering the fuel to the engine during operation of the engine based on the energy output required and the determined density of the fuel.

* * * * *

UNITED STATES PATENT AND TRADEMARK OFFICE
CERTIFICATE OF CORRECTION

PATENT NO. : 11,506,133 B2
APPLICATION NO. : 16/809711
DATED : November 22, 2022
INVENTOR(S) : Klingbeil et al.

It is certified that error appears in the above-identified patent and that said Letters Patent is hereby corrected as shown below:

On the Title Page

In Item (56), under "Other Publications", in Column 2, Line 1, delete "Hasanshin," and insert -- Khasanshin, --, therefor.

Signed and Sealed this
Thirty-first Day of January, 2023

Katherine Kelly Vidal
*Director of the United States Patent and Trademark Office*